(12) United States Patent  (10) Patent No.: US 7,467,135 B2
Coker et al.  (45) Date of Patent: Dec. 16, 2008

(54) SYSTEM AND METHOD FOR SMART SCRIPTING CALL CENTERS AND CONFIGURATION THEREOF

(75) Inventors: John L. Coker, Hillsborough, CA (US); Matthew S. Malden, San Francisco, CA (US); Kevin R. Nix, Dublin, CA (US)

(73) Assignee: Siebel Systems, Inc., San Mateo, CA (US)

( * ) Notice: Subject to any disclaimer, the term of this patent is extended or adjusted under 35 U.S.C. 154(b) by 438 days.

(21) Appl. No.: 10/900,339

(22) Filed: Jul. 27, 2004

(65) Prior Publication Data

US 2005/0086220 A1   Apr. 21, 2005

Related U.S. Application Data

(63) Continuation of application No. 09/866,878, filed on May 30, 2001, now Pat. No. 6,826,745, which is a continuation of application No. PCT/US99/28415, filed on Nov. 30, 1999.

(60) Provisional application No. 60/110,187, filed on Nov. 30, 1998.

(51) Int. Cl.
 *G06F 17/30* (2006.01)
 *G06F 7/00* (2006.01)
(52) U.S. Cl. .............. 707/4; 707/102; 707/10
(58) Field of Classification Search ...... 707/4, 707/102, 10, 101
 See application file for complete search history.

(56) References Cited

U.S. PATENT DOCUMENTS

| | | | |
|---|---|---|---|
| 4,931,926 A * | 6/1990 | Tanaka et al. | 704/8 |
| 5,341,469 A | 8/1994 | Rossberg | |
| 5,546,522 A * | 8/1996 | Nishida et al. | 715/810 |
| 5,566,330 A | 10/1996 | Sheffield | |
| 5,745,882 A | 4/1998 | Bixler | |
| 5,802,493 A | 9/1998 | Sheflott | |
| 5,819,249 A * | 10/1998 | Dohanich et al. | 706/46 |
| 5,826,240 A | 10/1998 | Brockman | |
| 5,854,927 A | 12/1998 | Gelissen | |
| 5,862,325 A * | 1/1999 | Reed et al. | 709/201 |
| 5,878,423 A | 3/1999 | Anderson | |
| 5,933,816 A | 8/1999 | Zeanah | |
| 6,038,668 A | 3/2000 | Chipman | |
| 6,076,091 A * | 6/2000 | Fohn et al. | 707/102 |
| 6,131,085 A | 10/2000 | Rossides | |
| 6,144,991 A * | 11/2000 | England | 709/205 |
| 6,173,279 B1 * | 1/2001 | Levin et al. | 707/3 |

(Continued)

OTHER PUBLICATIONS

Neil, Stephanie, "Calling All Customers," PC Week, v15, n37, p. 63(1), Sep. 14, 1998, ISSN: 0740-1604, DialogWeb, pp. 1-5.

(Continued)

*Primary Examiner*—Kuen S Lu
(74) *Attorney, Agent, or Firm*—Townsend and Townsend and Crew LLP

(57) ABSTRACT

The invention provides user configurable and reconfigurable scripting, methods of scripting, and systems for scripting for use by call centers, technical support centers, and marketers. Scripts are interactive tools that guide a telemarketer, a sales person, or a technical support technician through a telephone call with a customer. Scripts are characterized by going on to particular subsequent questions as a function of the customer's answer to a previous question.

18 Claims, 10 Drawing Sheets

U.S. PATENT DOCUMENTS 6,182,095 B1 1/2001 Leymaster
6,256,620 B1 7/2001 Jawahar
6,289,513 B1 9/2001 Bentwich
6,314,411 B1 * 11/2001 Armstrong ................... 706/11

OTHER PUBLICATIONS

Kasahara, Kiyoshi, "CTI: Building Better Bridges to Customers," Teleconnect, v15, n3, p. S8(6), Mar. 1997, ISSN: 0740-9354, DialogWeb, pp. 1-7.

* cited by examiner

```
                    61
                    /
   ┌─────────────────────────────────────────────┐
   │  First Name          Last Name       ┌───┐ │
   │                                      └───┘ │
   │  Campaign                                   │
   │  Service                                    │
   ├─────────────────────────────────────────────┤
   │  Script playing area.                    15 │
   │                                          /  │
   │  Thank you for calling Siebel systems. This is Tiffany, how can I help you today?
   │  o Need license key —17
   │  o Need upgrade to Siebel 99 —17
   │  • Need assistance on new SmartScript —17
   │
   │
   │  How long have you been working with SmartScript? —17
   │  ┌──────────┬───┐
   │  │ 1 week   │   │—19
   │  └──────────┴───┘
   │  Have you read the documentation? —17
   │  o Yes
   │  o No
   └─────────────────────────────────────────────┘
                        /
                       11
```

*FIG. 6*

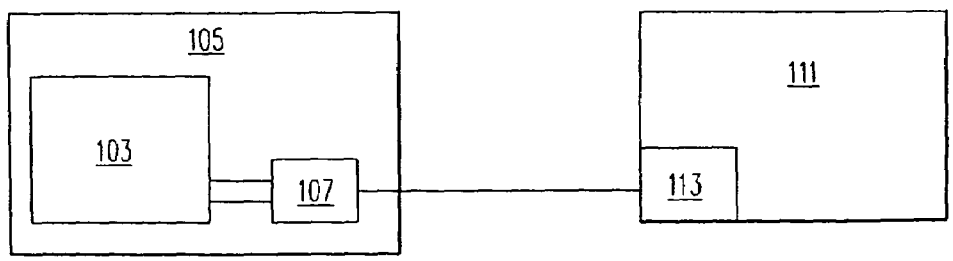

*FIG. 10*

SYSTEM AND METHOD FOR SMART SCRIPTING CALL CENTERS AND CONFIGURATION THEREOF

CROSS REFERENCE TO RELATED APPLICATIONS

This Application is a Continuation of Ser. No. 09/866,878 filed May 30, 2001 now U.S. Pat. No. 6,826,745 issued on Nov. 30, 2004, which is a Continuation of PCT Patent Application No. US99/28415 filed on Nov. 30, 1999, which claims the benefit of U.S. Provisional Patent Application No. 60/110,187 filed on Nov. 30, 1998, each of which is hereby incorporated by reference in its entirety.

FIELD OF THE INVENTION

This invention relates to scripting, including methods of scripting, systems for scripting, and user friendly methods, systems, products, and tools for configuring, reconfiguring, customizing, and enhancing the scripts. This invention particularly relates to end-user (call center or marketing representative) customization and modification of the script contents and/or logic.

BACKGROUND

Scripting is used for call centers, customer support centers and technical support centers to empower customer service representatives and telesales and telemarketing professionals. Scripts, as used herein, are interactive tools that guide a user, as a telemarketer, a sales person, or a technical support technician through a telephone or in-person/point of sale/point of service interaction with a customer. Scripts are characterized by branching from a question to particular subsequent questions, or to an associated database, as a function of the customer's answer to a previous question or an output of an associated database, thereby automatically guiding the user-customer dialog while enforcing workflow and the business process.

Scripts are used in a variety of different scenarios from sales to service in the financial, telecommunications, insurance, and retailing industries, among others. Scripts can be used to gather information, disseminate information, create new customers, take orders, etc. Third party outsourced vendors rely heavily on scripts to guide users through a variety of different work flows on different products. Vendors use scripts as a way to ensure that product will be sold and services provided in the manner their customers desire; that is, a manufacturer may contract out its "Help Desk" or "Telemarketing" functions to a vendor, and will therefore find it desirable to provide scripts to enable the vendor to respond to service requests or sales opportunities.

A clear need exists for scripts that interact with underlying associated databases, e.g., inputting data to the databases, extracting data from the databases, and branching in response to both user and/or customer inputs and to data inputs and/or outputs to or from the databases.

Scripts generally require a certain amount of customization and configuration, for example, to the user's business or business process, and to changes in the metadata and metastructure of any underlying or associated databases. Heretofore, script customization, configuration, and reconfiguration has required a substantial amount of code rewriting and revision, or a substantial amount of software overhead to support a very limited amount of mainly cosmetic customization features.

A clear need exists for a script method and system that facilitates end-user customization, configuration, and reconfiguration with a minimum amount of software overhead and code rewriting.

SUMMARY OF THE INVENTION

According to our invention there is provided a system, and method where the underlying software structure is readily configurable and reconfigurable by the user, and utilizes reusable objects (including routines, subroutines, and functions) having data, public functions and variables accessible to the end users, private functions and variables not generally accessible tn end users, and where the product, system, and method can be configured, reconfigured, modified and/or personalized through derived classes or functions that call the public functions of these objects, reusing them and inheriting their properties as in object oriented programming and/or through function and subroutine calls and passing variables as in convention programming.

The invention disclosed herein provides a system for facilitating interaction between a customer and a service provider. The system is configurable and with a set of reusable components, as either reusable objects, data, public functions, and private functions, or routines, subroutines, and functions with global variables and local variables. The public functions, routines, and subroutines, which are callable by an end user, can be accessed through derived classes of objects or calls. The system also includes a script and an associated database.

The script has a hierarchical set of structured pages, with at least one of the pages having a structured set of questions. At least one of the questions has responses that causes the system to either i) link to an associated database, or ii) link to another question in the script. The link may be a query, or the output of the database serving as a link to another question in the script. Where link is input to our output of the database, the data is data related to the interaction.

When the link is a link to another question in the script, the link may be to a question in the same page or a link to another question in another page in the script.

In a further exemplification of the invention, there is provided a system, which may include one or more computers, with computer program code, running on one or more computers, for facilitating interaction between a customer and a service provider. The code is made up of reusable elements such as the objects, functions, and variables of object oriented programming, or the functions, routines, subroutines, global variables, and local variables, and calls of conventional programming paradigms. The computer program code includes a script and an associated database, and causes the system to a) present a question to a user, b) receive a response from the user, and c) branch to link to either i) the associated database, or ii) to another question, both in response to the user's response to the question.

The computer program code can cause a query of the associated database, and, as a result of the query, cause the database to output a link to another question in the script, or to cause the database to output data related to the interaction. Alternatively, the computer program code cause a link to another question which is in another page in the script.

In the case of object oriented programming language, the computer program code contains base objects containing data, public functions, and private functions, and the computer program code is configured to utilize additional classes of objects inheriting properties of said base objects. However, in the case of such programming languagesd as FORTRAN, BASIC, and the like, the program code contains, functions, routines, and subroutines, and calls, which use global variables to call the functions, routines, and subroutines.

A further aspect of our invention is a method of configuring software adapted for facilitating interaction between a customer and a service provider utilizing a script and an associated database. The method of the invention utilizes reusable components, such as calling a set of reusable objects, data, public functions, and private functions, where the public functions are accessed through derived classes of objects, in object oriented programming, and calling functions, routines, and subroutines in conventional programming.

The script is a set of hierarchicaly structured pages, with at least one of the pages having a structured set of questions, where at least one of the questions has responses, and at least one of the responses causes the system to either i) link to an associated database, or ii) link to another question in the script. The method involves the steps of: (a). presenting a question to a user, (b). receiving a response from the user, and (c). branch in response to the user's response to the question to link to either i) the associated database, or ii) another question.

The method may include querying the database through the link to the associated database, the output of the database may be a link to another question in the script, or data related to the interaction, or a link to another page in the script.

The method of the invention includes creating either derived objects and calling a set of reusable base objects, data, public functions, and private functions, or calls using functions, routines, and subroutines.

A script is assembled from a set of modular elements. The modular elements are, in increasing order of granularity, the script, one or more pages within the script, one or more questions per page, a set of answers for each question, branching logic from the answer set, and an associated database or databases which input and/or output data in response to questions and/or answers thereto. A script may have a plurality of pages, each such page having a plurality of questions displayed in one view. Each question, in turn, has an answer set, with the answers having branches to other modules, for example, other pages or questions. The scripts of our invention are characterized by branching within and between scripts, pages, and questions. The branching may be driven by a customer's answer to a question, either alone or in combination with contents of the underlying database or databases.

Modular elements, which are ordered and directed sets of questions, answers, answer-driven branches, and answer driven database accesses, serve to control and guide the employee-customer interaction. This is done by enforcing business processes during the interaction. The questions are logically related questions within the business process. Enforcing business processes through branching and database accesses enables users, as well as call center agents, to interact with customers in a useful and productive manner. With respect to the business process, including control of the business process, and branching, each page preferably has a plurality of questions, with each question being capable of having one or more answers. The modular elements contain objects which may be called by other objects (as functions and variables), that is by calling public functions of a called object. Additionally, the objects permit end-user configuration to control the logical flow of questions, responses, and links.

The method and the system of our invention both provide for verifying one or more of the absence of unreachable pages, unreachable questions, and missing answer branches, and the presence of pages called by the script and translations.

The script method and system of our invention provides for visual representation of questions. The questions may be visually presented to accommodate the agent's skill level or the desired flow of the script. This allows for controllably revealing of future questions to the telemarketer, user, or customer service technician by revealing the current question, all questions within a page or all questions that will definitely be reached.

A further aspect of the method and system of our invention is the relationship of the script with one or more underlying or associated databases. This provides, among other things, the capability of saving customer answers and/or retrieving customer and/or product or service histories, characteristics, or properties. Customer answers may be saved in an answer table, which requires no configuration and saves all responses for questions that an administrator specifies should be saved. These responses may then be transferred to an associated external application for further analysis. In addition, responses can be directly saved in the business object and/or business component so that it is immediately accessible by the call center agents. Additionally, default answers may be provided, which may be overwritten when conducting the script.

A further aspect of our invention is a method of, and a system for creating, upgrading, configuring, reconfiguring, enhancing, or personalizing customer interaction scripts using object oriented programming tools, methodology and paradigms, for interaction with the associated database. For example the upgraded, enhanced, configured or reconfigured, personalized, or customized script may be based upon the underlying database or databases. The associated database or databases contain customer data, product and/or service data. The internal logic of the script links the databases to the script to enable using the database contents in a dialog with a customer, and in conjunction with the internal logic for linking the pages, questions, responses, branches, database accesses, and database contents together. A further aspect of our invention is the dynamic creation of questions for a script through the script's interaction with the database or databases.

According to a further aspect of the method and system of our invention, scripts are distributed to users in the field. This distribution may be based upon visibility rules of the users in field. That is, a user in the field may receive only scripts applicable to his or her customer set or product set. In this way, a script may be created that is specific to input from a database of customer data and product data and a specific user's contact list. The output is both a script that is directly applicable to the customer set, and the user's "task list."

The script may include a generic answer table, and a business component field, with the answers including data to be reflected in enterprise's business data. The scripting method and system of our invention facilitates saving answers to specified questions in an answer table or directly in one or more business component(s) and/or associated databases. In this way, responses can be saved and stored in different business components and business component fields.

The user interface of the desktop may be such as to insure that important questions and data are always visible to the user. This is referred to herein as a dynamic dashboard. Moreover, the desktop view may provide a section of the screen that displays script-page-question treeing and/or script-page-question-answer-link treeing, in order to enable the user to easily navigate around the script. In addition, a section of the screen may store persistent data about the caller, product interest, owned products, utilized services, and script metrics, for example, such as Time Elapsed and Target Time.

In a preferred embodiment the script is fully integrated among and between the global set of scripts, questions, answers, and database accesses, to allow launching of other views and returning to the script. According to our invention capability is provided to automatically launch scripts from a computer telephony integration (CTI) system, or from underlying code or commands, as in Visual Basic, JavaScript or Visual C++.

The structure of the underlying system and system logic allows re-use of individual pages in multiple scripts. Moreover, the scripting method and system of our invention uses object oriented programming techniques, tools, and paradigms, especially for user configuration and reconfiguration. In this way objects may be created, declaring variables of a provided class or deriving a class, whereby the derived objects inherit properties from the provided or base objects. This facilitates a single location of administration, including pre-, and post-validation and branch handlers.

The method, system, and program of our invention provide a high degree of flexibility to support complex scripting needs, including multi-lingual call scripts supporting multi-lingual call centers, and easy local personalization and modification.

The scripting method and system of our invention facilitates reducing the navigational choices of the call center user by locking the choices into the script user interface and, thereby, enforcing the desired business process and workflow that the organization wishes its users to follow. It further facilitates the ability of end-users and end-user administrators to modify or enhance or personalize the product by creating new objects and inherting properties based on existing or base objects. The scripting method and system of our invention replaces standard forms based user interfaces, with a dynamically generated user interface that uses answers to previous questions and the contents of underlying databases to drive the interaction and lead the user through a series of selected questions.

The scripting method and system of our invention may be presented or augmented in two components, an Agent interface and an Administration interface. The Administration interface allows users to define and link the various elements of a script together. The information about the elements in the script lives in the database, and the Agent interface calls that information.

The method and system of our invention is operable in various scenarios, including, but not limited to (i) a connected standard call center application, (ii) a thin client; (iii) over the World Wide Web or other internet or intranet. The script may be launched from (i) an on screen menu item; (ii) a user response, as when a script is associated with a sales campaign or a specific product; (iii) a CTI screen pop up; and (iv) programmatically from Visual Basic, JavaScript, Visual C++ or other program.

The script responses are saved to the associated database in normalized or denormalized format. By this expedient users are able to access the stored information either for reporting, or calling up from the script at a later point in time. Sections or fields of information in the script may be mapped to business components for automatic save to the database. Users are able to define if those saves occur during the script or at the time of script save. The script system determines the nature of the information coming from the script (i.e. is the database access an insert, an update, etc). Separate tables from the standard business components may exist to accommodate these requirements. In a further interaction with the underlying database or databases, administrators and/or users are able to access standard sets of information from business component databases. These standard sets of information include product information, contact names, and any type of custom lookup.

Scripts are able to launch customized VB or JavaScript code and any other scripting language from anywhere in the script. This code can be used to do any number of actions surrounding the workflow and configuration of the script. Users are able to store the code in the scripting tables or the standard location for code/programs.

The scripting method and system of our invention are able to generate dynamic text for the user. For example, an entire block of text (i.e. something a user says to a customer) might be dynamic and driven from a source other than the scripting metadata. Another example would be to insert a name dynamically into a sentence, or change the wording based on time of day, etc.

The scripting method and system of our invention may be described and illustrated in terms of its scripting metadata. Scripting metadata includes information about the script itself, and, optionally, the underlying databases. The metadata can include a wide range of data about the script, from what the interface looks like and how it should behave, through logical branches in the script, to sites of database access including the type of database access (read, write), the database fields accessed, data about the database data, and such metadata as internal and external links, graphics, data structures, and the like. The metadata shows table that are hierarchically arranged with clear relationships between the script members.

THE FIGURES

The method and system of our invention may be understood by reference to the Figures appended hereto.

FIG. 1 shows a script, with three Pages depending from it. Each Page has text questions depending from it. In turn, each question has answers depending from it. The answers provide branches to other questions.

In FIG. 2, L represents the unique links between each of the elements.

FIG. 3 is a flow chart illustrating the flow paths of a scripted customer interaction, in the case of a call to a potential buyer of a pager.

FIG. 6 illustrates one form of a user window in the scripting method and system of our invention.

FIG. 10 shows a system of the invention.

DETAILED DESCRIPTION OF THE INVENTION

Figure 1:
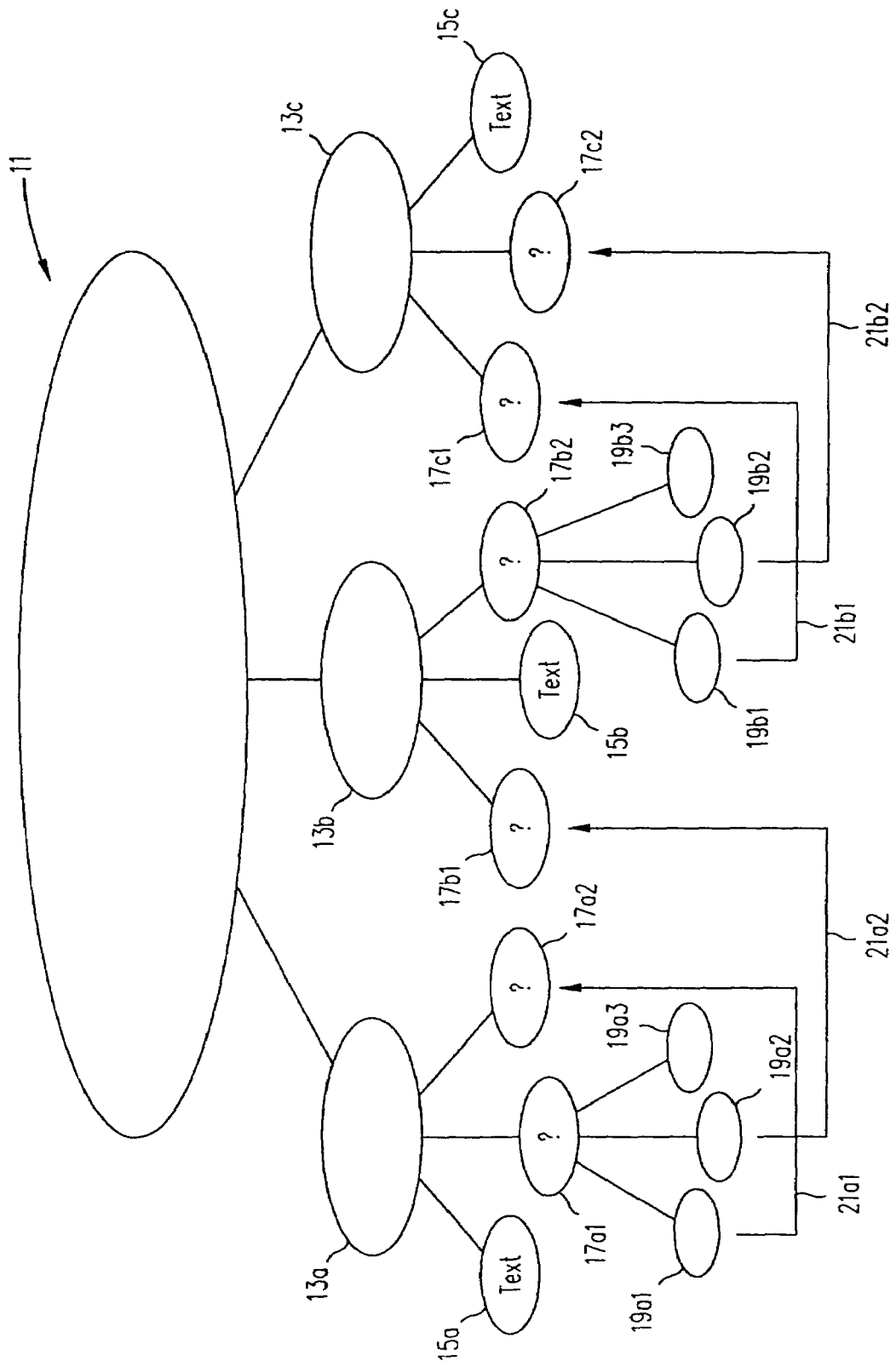

According to our invention, there is provided a system and a method for facilitating interaction between a customer and a service provider. The system contains a script and an associated database, where a script is a hierarchical set of structured pages, and at least one of the pages contains a structured set of questions. The questions each have a set of likely responses, where at least one and preferably more of the likely responses causes the system to either link to an associated database, or link to another question in the script.

The system, 101, of the invention is shown in FIG. 10. The system includes a database, 103, running on a database server 105 with a database management system 107, and a call center terminal, 111, running or having network access to the script software 113. The terminal 111 is linked to the database server 105 and the database, either in a client-server relationship or through an internet or intranet.

The link to an associated database may be a query. The output of the database may be a link to another question in the script, or data related to the interaction. Alternatively, where the link is another question in the script, the link may be to either the same page or to another in the script.

The method and system of the invention are implemented in computer code that causes the system to present a question to a user, receive a response from the user, and branch as a result of the response. The branch may be a link to the associated database, or to another question in the script. Where the link is to an associated database, it may cause a query of the associated database. In turn, the associated database may cause the database to output a link to another question in the script, or to output data related to the interaction. Alternatively, the computer program code may cause a link to another question which is in the same page or another page in the script.

A further aspect of our invention is a method of facilitating interaction between a customer and a service provider utilizing a script and an associated database, where the script has a hierarchical set of structured pages, with at least one of the pages having a structured set of questions. At least one of the questions has a set of likely responses. The responses drive the logical flow of the process, with each different response likely causing the system to either link to an associated database, or link to another question in the script. The first step in the method of our invention is the presentation of a question to a user, and receiving a response from the user. The method then generates a branch in response to the user's response to the question. The branch causes a to link to an associated database, or to another question.

A further aspect of our invention is the facilitation of end-user modifications, personalizations and customizations by deriving and defining objects, as classes, functions, and variables based upon incorporated or base objects, as classes, functions, and variables, using the methods of object oriented programming.

Terminology

Throughout this document, we will use the following terms in reference to the scripting method and system of our invention:

1. A Question represents a single interaction between a call script and the phone operator, user, or agent. Questions may be either a block of actions that a user must say (demonstrative) or do, or an actual questions (interrogative). Questions are attached to groups and choices, and represent a single interaction between a user and the system or underlying associated data base. Questions may have answers and may not even collect information.

2. An Answer is a specific value defined for a question. Answers are used both to constrain user responses to questions and to control navigation from that question.

3. A Script Wizard script is an ordered set of Questions and the branches between them. Questions can be used in more than one script and are associated with scripts only through the branches.

4. A Script is an ordered set of Pages and the branches between them. Each page defines branching within it much like Script Wizard scripts. The Script defines branching only between pages.

5. An Branch is a single link between one question and another or one page and another representing a transfer of control.

6. A Page is a set of questions, including branching, which can be used in more than one script.

7. The Script Wizard is a set of dialogs which prompt the user through the call script. The wizard presents the current question, validates the user input (if any) and transitions to the next question.

8. The Script UI is a tabbed dialog which presents more than one question at a time and organizes questions into pages. This is also called the Dynamic Desktop.

9. A Choice is an option or set of options for the user to select as an answer to a question. Choices are attached to questions as a set of permitted responses. Choices may have scores and weights associated with them.

Figure 2:
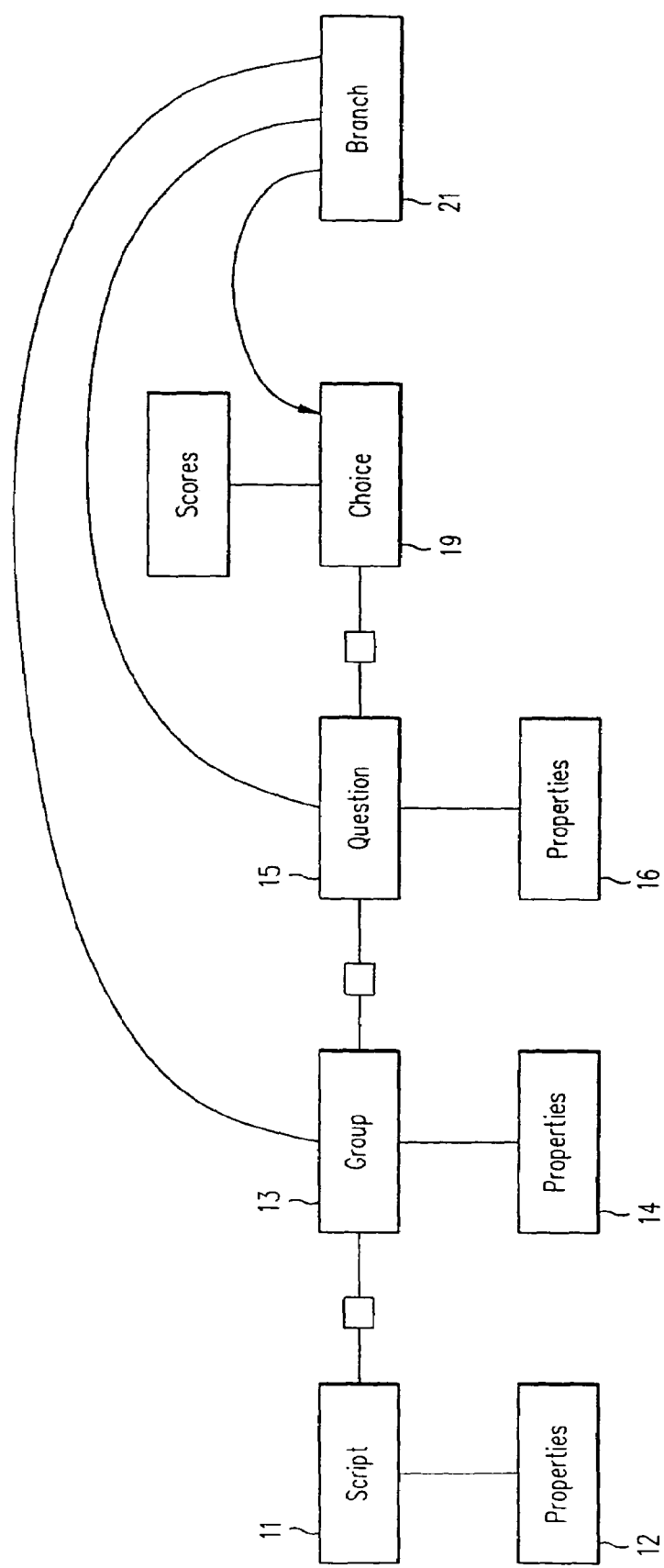
FIG. 2 illustrates the relationships between the elements of a script.

10. A Branch is a point of logical flow in the script, serving as a link between one question and another, or one page and another, representing a transfer of control within the script. Branches carry the user from one place in the script to the another place in the script. Branches may occur FROM questions, pages or scripts and TO questions, pages or scripts. Branching may be implicit, explicit or computed Scripting According to our invention, scripting is the use of ordered and structured sets of pages of ordered and structured sets of logically linked questions and sets of likely responses thereto, with branching from and to questions, and accessing of associated databases, for example to drive branching or subsequent questions. Scripting can be illustrated by considering the scripting metadata. Metadata is used here in the sense of "data about the data" and refers broadly to the structure and architecture of the data. Scripting metadata includes information about the script itself, what it looks like, how it should behave, and how it should be driven by scripting metadata as shown in FIGS. 1 and 2. FIG. 1 shows a script, 11, with three Pages, 13a, 13b, 13c, depending from the script, 11. Each Page, 13a, 13b, 13c, in turn, has text questions, 15a, 15b, 15c, depending from it. Likewise, each question, 13a, 13b, 13c, in turn, has answers, 17a1, 17a2, 17b1, 17b2, 17c1, 17c2, depending from it. The answers, 17, provide branches 21a1, 21a2, 21b1, 21b2, to other questions, or to other functions within the script, such as the retrieval of information from associated databases.

The structure and order is illustrated by considering the script metadata structure in terms of tables. The tables making up the script are hierarchically arranged with clear relationships between the following members: script-page-question-answer.

Property type information may be passed from elements at a higher level of the script to elements at lower levels of the script. The user is able to over-ride the introduction of property type information at any lower level.

FIG. 2 illustrates the relationships and interactions between the elements of the script. In FIG. 2, "L" represents the unique links between each of the elements of the script. Using the illustration of FIG. 2, according to our invention, a script, 11, has properties, 12, and is a structured and ordered flow of information, where information is elicited by structured and ordered pages and/or groups of questions, 13, with page or group properties, 14, of structured and ordered questions, 15, with properties, 16, and where the information provided in response to the questions, 13, either drives, through choices, 19, and branches and links, 21, subsequent questions, provides input to one or more associated databases, or elicits an output from an associated database.

Figure 3A:
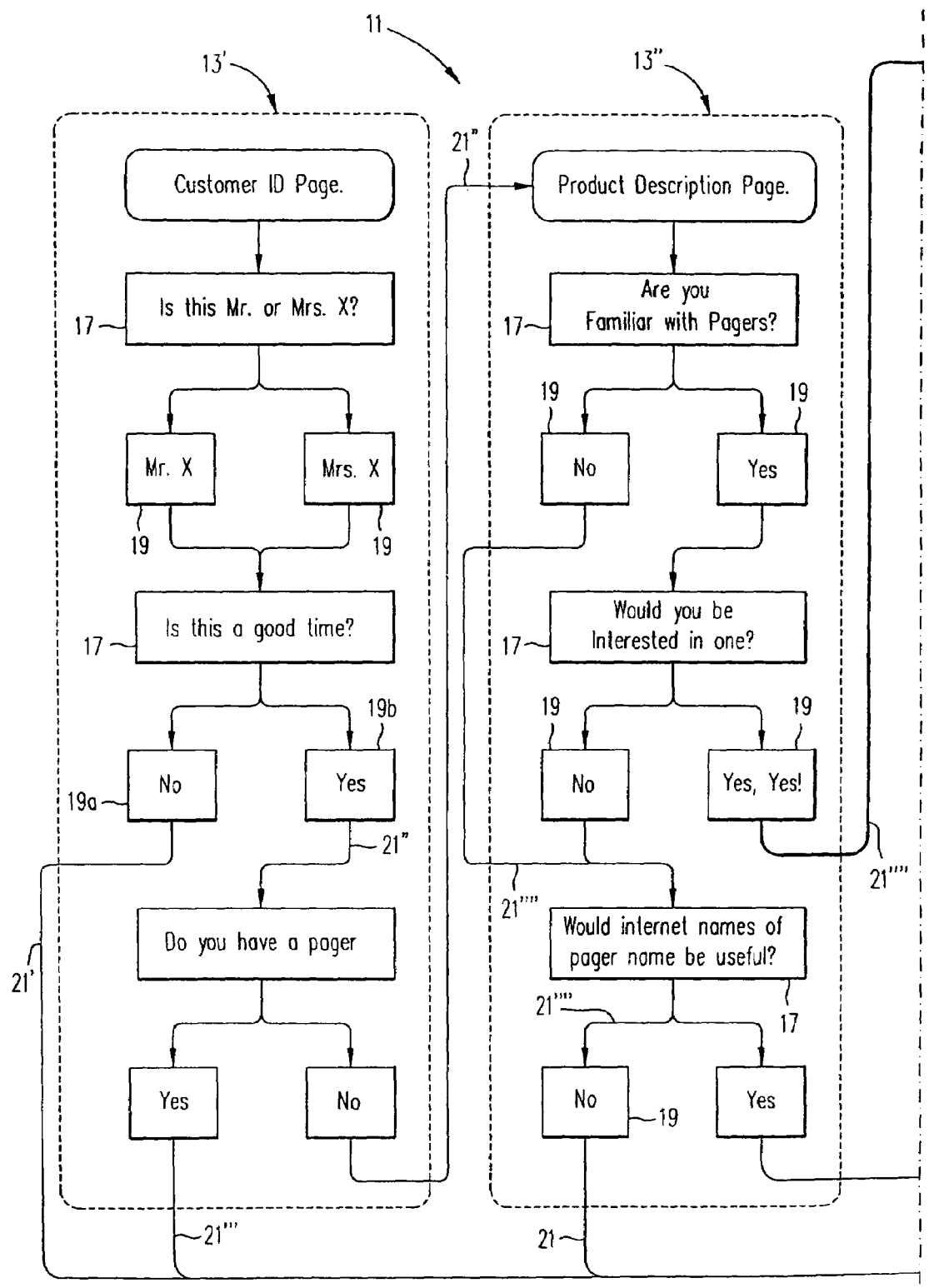
FIG. 3a is a partial illustration of FIG. 3.
Figure 3B:
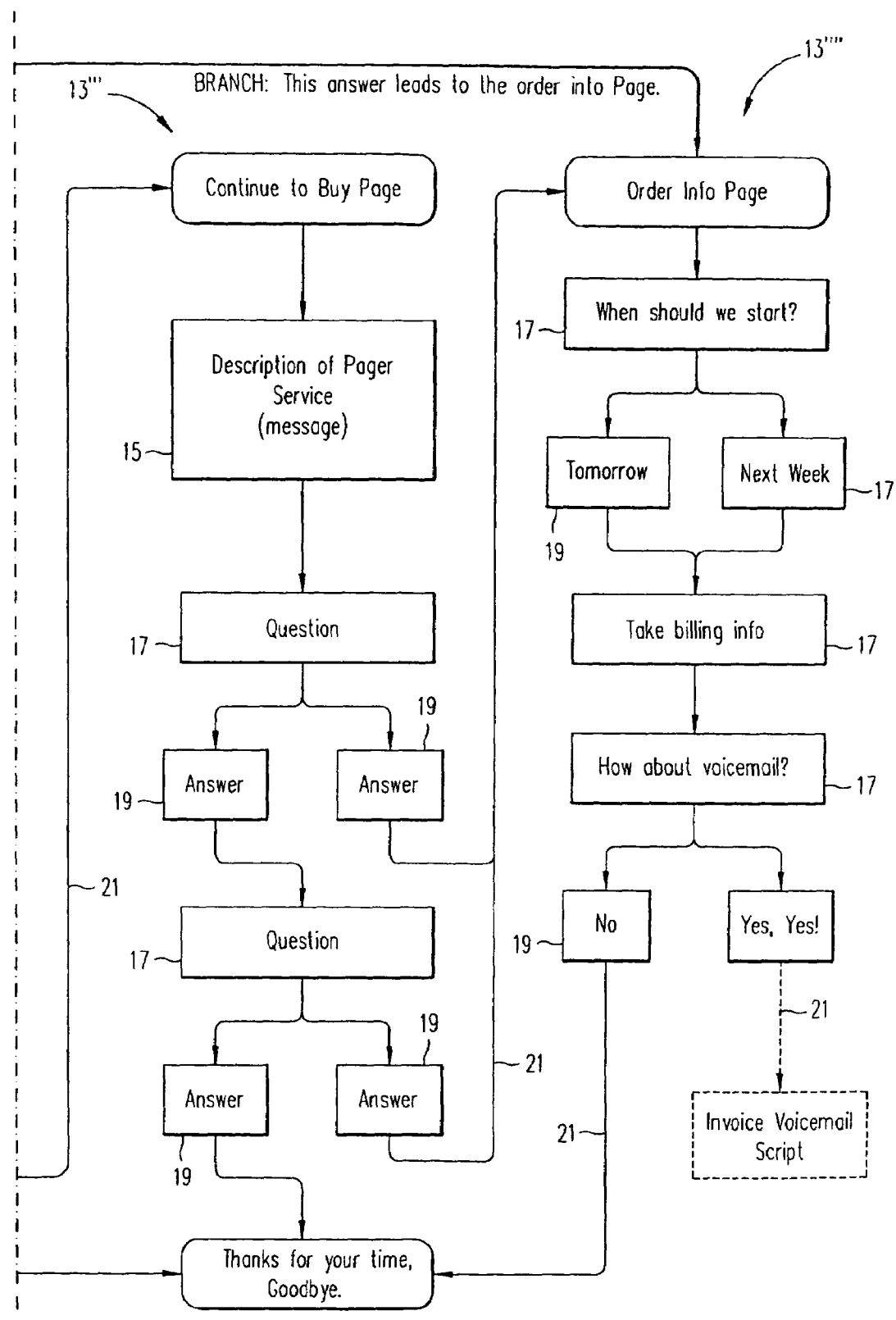
FIG. 3b is a partial illustration of FIG. 3.
Figure 4:
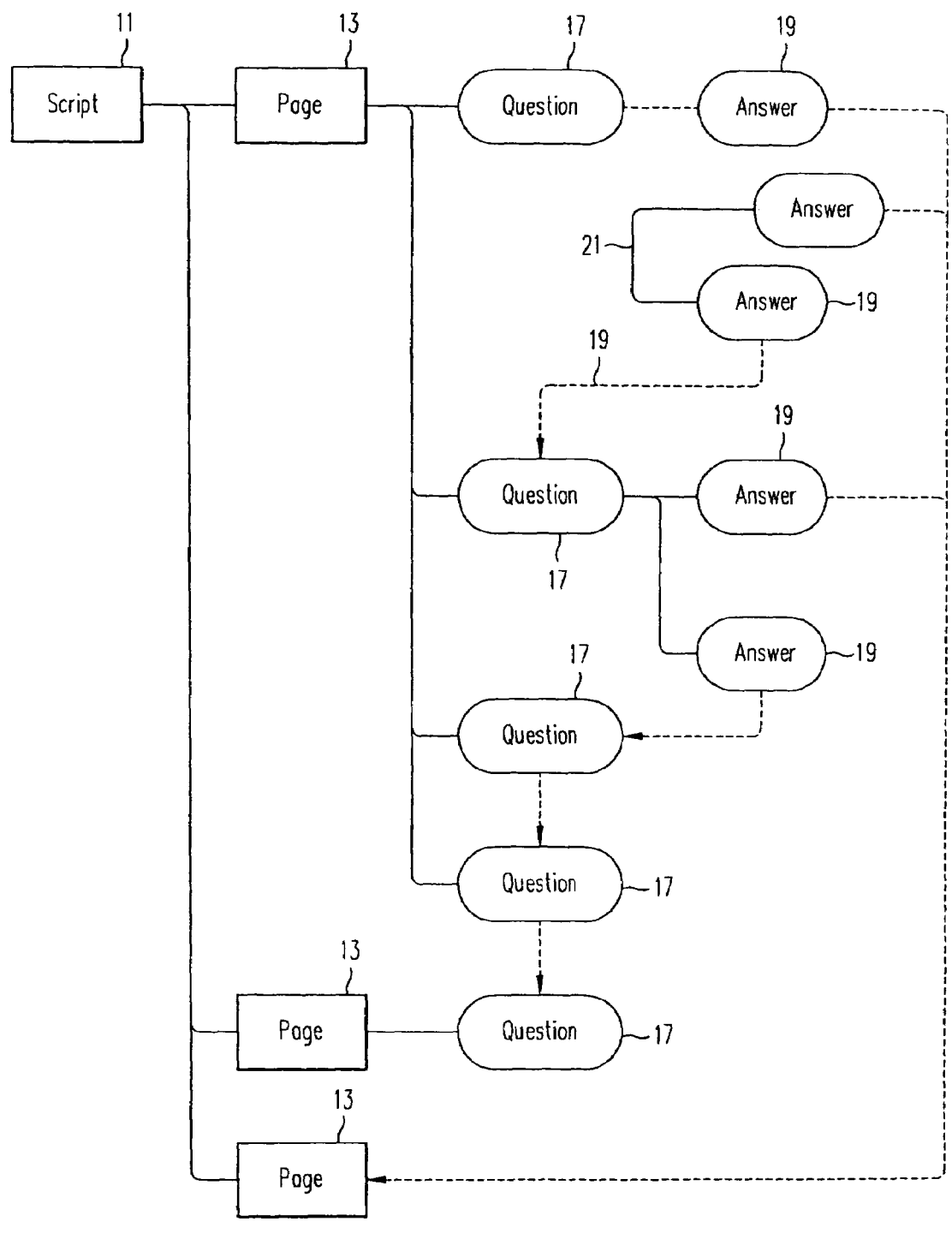
FIG. 4 illustrates the script structure and logical relationships of a telephone service or telephone marketing script, with the script-page-question-answer hierarchy.
Figure 5:
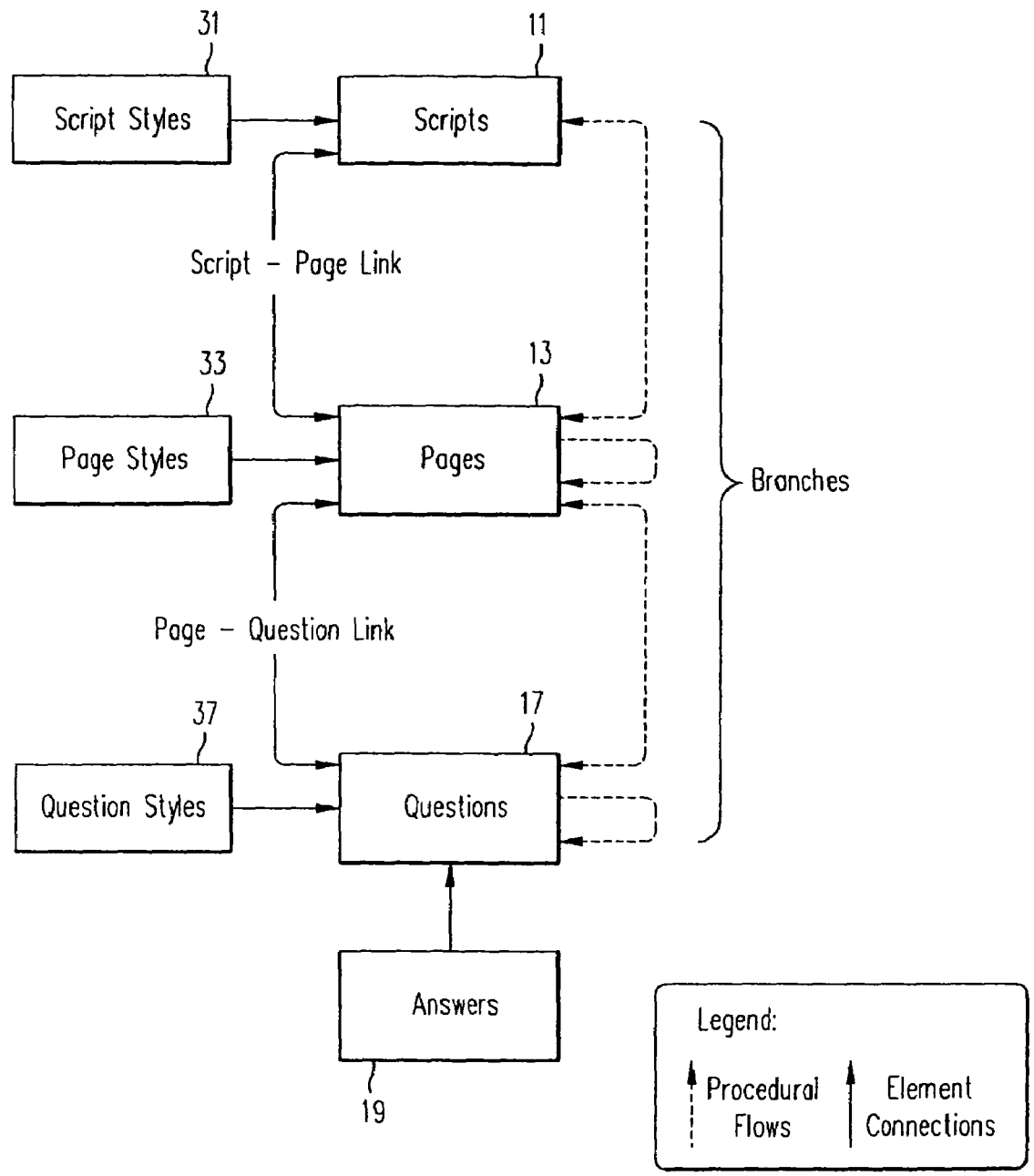
FIG. 5 illustrates the procedural connections between major database objects or script elements, including styles.

In this regard, scripting can be illustrated by considering the flow of information in a scripted interaction. This is shown graphically in FIGS. 3, 4, and 5. FIG. 3 is a flow chart illustrating the flow paths of a scripted customer interaction, in the case of a call to a potential buyer of a pager. FIG. 4 illustrates the script structure and logical relationships of a telephone service or telephone marketing script, with the script-page-question-answer hierarchy. FIG. 5 illustrates the procedural connections between major database objects or script elements, including styles.

Turning to FIG. 3, there are four pages, the customer id page, $13^i$, the product description page, $13^{ii}$, the convince to buy page, $13^{iii}$, and the order information page, $13^{iv}$. The customer id page, $13^i$, starts out with courtesy questions, 17, and responses 19, 19a, 19b. Note that responses 19a and 19b, that this is either a good time or a bad time to call lead through different links, link $21^1$ that this is a bad time leads to terminating the call, while link $21^{ii}$, that this is a good time to call leads to a subsequent question, "Do you have a pager?" This also leads to a branch, with a "yes" answer going through link $21^{iii}$ to the exit, while answer "No" leads through link $21^{iv}$ to the product description page $13^{ii}$. The first question 17 on this page is "Are you familiar with pagers?" A "No" answer leads through link $21^v$ to a second attempt to interest the customer, i.e., "Would instant notice of news items be useful?" Again, a "No" answer leads to the exit through link $21^{vi}$. A "Yes" answer to "Would you be interested in one?" leads to another page, $13^{iii}$, the "Order Information" page, while a "No answer leads to "Would instant notice of news items be useful?" Again, a "No" answer leads to the exit through link $21^{vi}$, while a "Yes" answer leads to another page, $13^{iii}$, the Convince to Buy" page. This same type of logic is carried forward into the subsequent pages, $13^{iii}$, and $13^{iv}$.

FIG. 4 shows the underlying logic of a script 11, with pages 13, questions 17, answers 19, and links 21. FIG. 5 shows the relationship to the script metadata, with script styles, 31, page styles, 33, and question styles, 37, feeding to scripts 11, pages, 13, and questions, 17, and answers, 19, along with the branches and links previously defined.

FIG. 6 shows the script 11 view seen by a user, with text 15, questions 17 ("Need license key?" "Need upgrade to Siebel 99", "Need assistance on new Smart Script"), with the answer to "Need assistance on new Smart Script" leading to another question ("How long have you been working with Smart Script?) and answer 19 choice box, and a subsequent question "Have you read the documentation?" 17.

The top applet on the view of FIG. 6, element 61, is the persistent information about the customer contact and the product, service, or campaign. This should remain visually available throughout the script execution. The desktop area should display one script page at a time. These script pages are launched upon script execution, via branching from another question, via branching from another script, or following in order from the completion of the previous page.

Users view the scripts and navigate through different pages by clicking on the linked script or page nav bar. Opening up the linked script nav bar explodes the view into all of the scripts linked to this script. Scripts that have already been touched may be a different color, size, or font, or if a script property is set, may not be visible. This will mean that these menu items are not designed during design, but are dynamically created at run time. The same property applies to pages as well.

Figure 7:
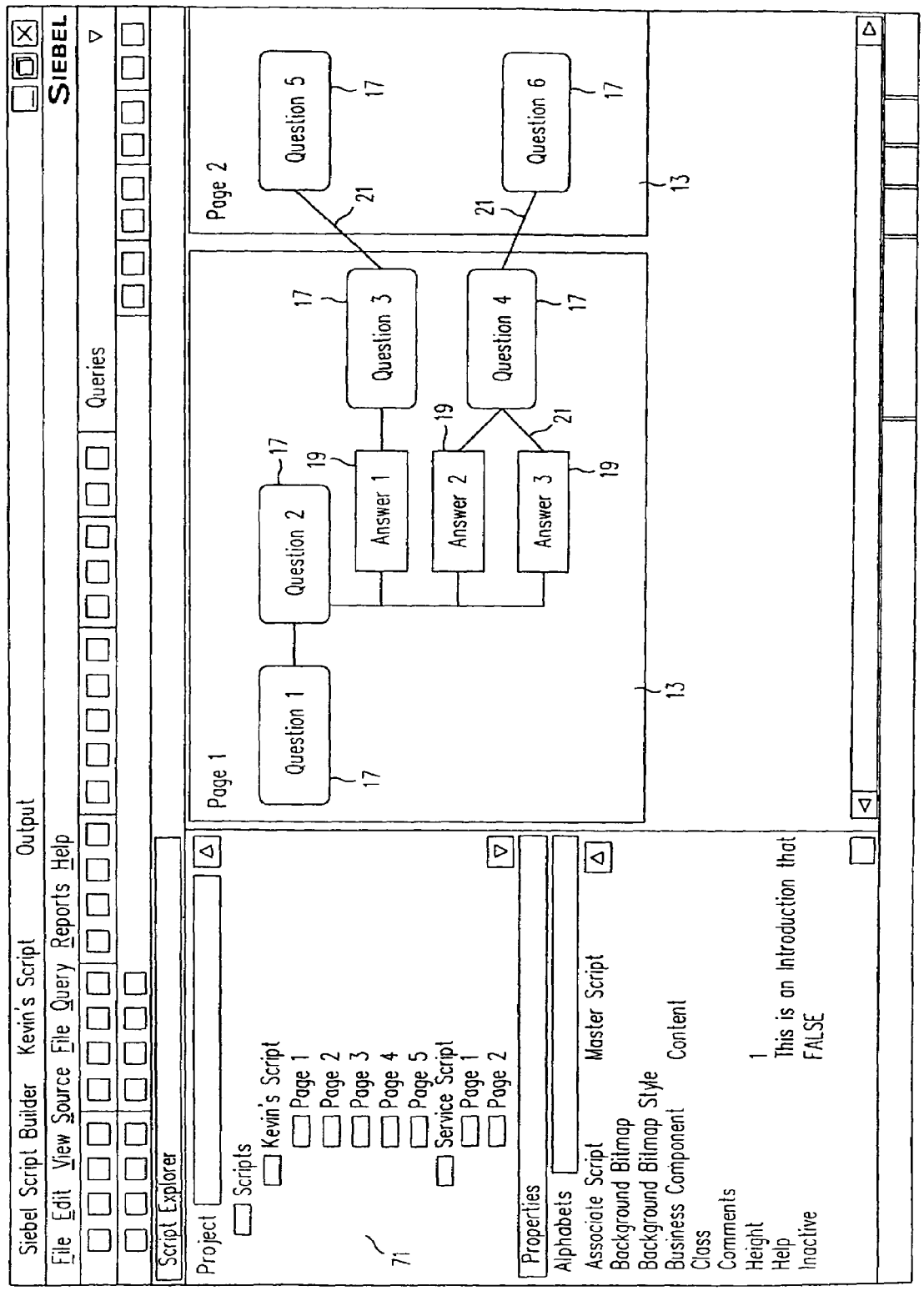
FIG. 7 illustrates the administrator's view of the script method and system of out invention.

The explorer tree view, 71, shown on the left of FIG. 7, allows users to navigate through the list of scripts, pages and questions in a hierarchical fashion. The script path view allows the user to see a list applet of all questions that have been asked in this script session. The call script page area is shortened and scroll bars appear for horizontal and vertical scrolling. An example of the call script branches view is listed below.

The Explorer shows a tree control of the script path with the groups and questions answered. The user is able to navigate to any place in the script from that tree control.

Users are able to configure and reconfigure scripts, that is, users are able to build components one at a time and link them together as they build (top down script building) or create all script components and then link them together (bottom up method).

Figure 8:
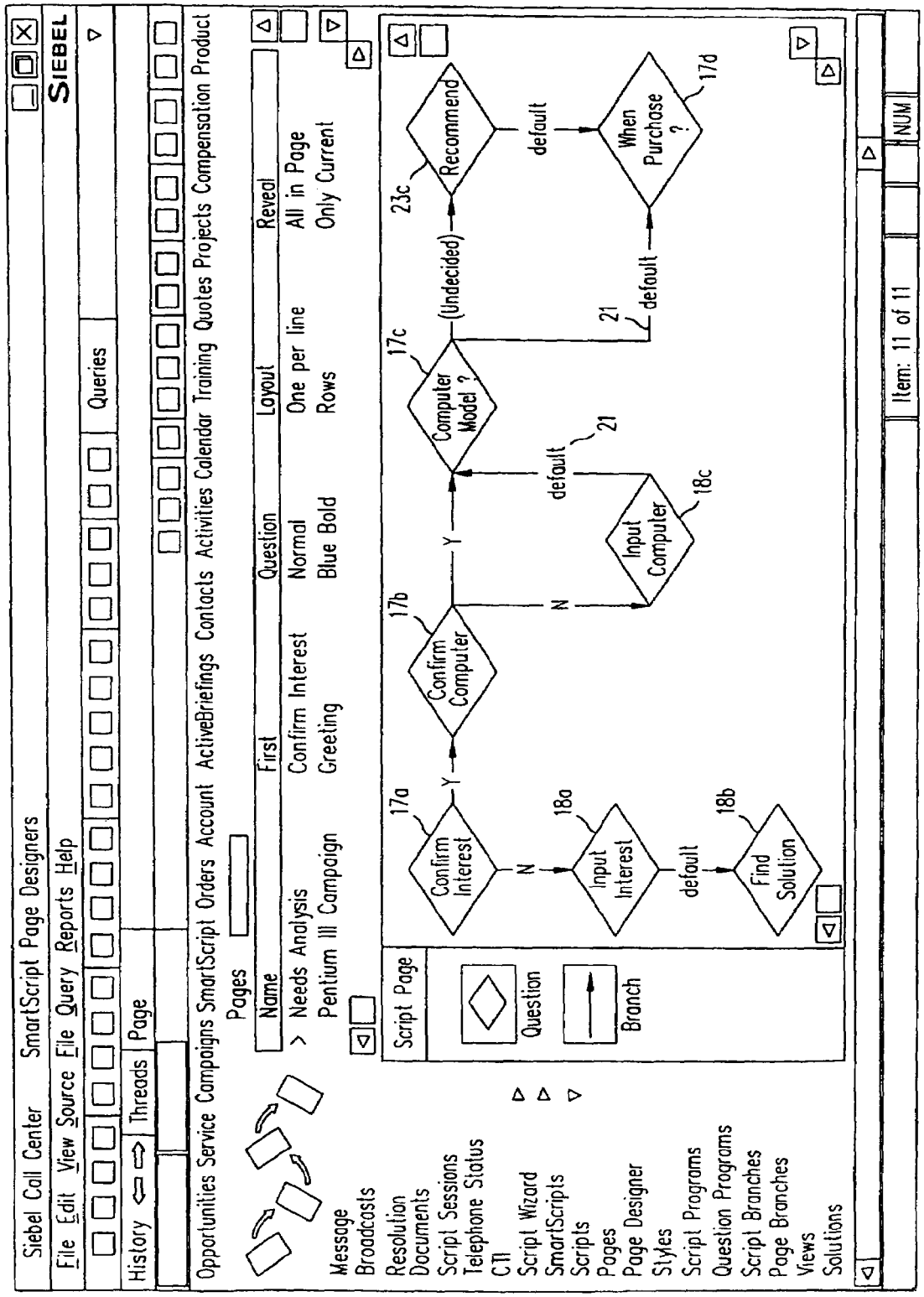
FIG. 8 shows a screen shoot of the page designs of the invention with the questions and the branches out of the questions.

The structural diagram, shown in FIG. 7, contains a high level, metadata view of the links between questions, 17, and pages, 13, and illustrates the ability for the administrator to navigate through the list of scripts, related scripts (i.e. groups) pages, questions and answers. FIG. 8 shows a further logical and metadata and schema view of the script 11 for the telephone sale of a computer, where question 17a is a confirmation of interest, and actions 18a and 18b are links to a database to input interest, 18a, and find a solution, 18b. Question 17b is a confirmation of computer, with an input of a computer 18 by the representative if the customer does not specify a computer. The next question 17c, request a computer model input with links to a recommendation, 23c, and "when Purchase", 17d.

When a script is launched, the page sequence determines which pages will come into view first. The pages will appear in a pre-configured applet type called a call script applet. Within, for example, Siebel Tools, the configurator will determine the applet size in sectors and mark this applet as a call script applet. This applet region, in turn, is activated when a call script is in operation. The call script linked to that view determines the behavior of the call script applet region. This operation is performed as part of call script administration.

Multiple questions for a given page may appear at the same time and the user can enter answers to the questions in any sequence.

Programs

Provide a place for users to create modular event names that can be used anywhere in a script. These would appear in the handler drop down in the properties views. Any event that has been created can be used as any type of event, except for computed branches. There should be a check box to denote computed branches.

Administrators/Authors are able to export scripts and import them. The export process should export the script in a transportable mode so that it can be easily imported into another database with possible different metadata repositories. Among items that can be exported are the hierarchy and all of its script/group/questions/choices/branches and their properties. Importing notifies the user if there is an error or conflict. The import process should load all of the new information into the database with new ids or utilize existing objects.

Objection Handling. A view may be created for users to create objections and their rebuttals.

The Data Model

Various tables are needed to support Scripting (see the Appendix for table listings). Interface tables are also needed for exporting the answer tables.

Questions and Answers

The tables which contain questions and answers are separate from the actual Scripts which use those questions so they can be reused in multiple scripts. The tables include, among others, S_CS_QUEST and S_CS_ANSWR, each with a translation table (S_CS_QUEST_LANG and S_CS_ANSWR_LANG). Answers are children of questions and each answer can be used by only one question. Each translation is a child of a single question or answer. All foreign keys in the system named QUEST_ID point to S_CS_QUEST (not the translation) and all keys named ANSWR_ID point to S_CS_ANSWR.

Answers are children of questions, in a many-to-one relationship. Each question may have zero or more answers. Individual answers are distinguished by their ORDER_BY column (an integer value). This ORDER_BY column indicates the order in which the answers are to be presented in the question. The user key columns for S_CS_ANSWER are QUEST_ID and ORDER_BY.

An important attribute of a question is it's "answer type" (S_CS_QUEST.ANSWR_TYPE_CD). This type code identifies the type of data collected by the question.

Another important attribute is the "choice" flag (S_CS_QUEST.CHOICE_FLG). If this flag is true, the user must pick from the list of answers for the question (and answers must exist). The wizard will display multiple choice questions in a combo box. If answers are defined, the combo box will be read-only (a "drop-list") otherwise it will be editable. If this flag is false, the answer is not constrained to an explicit list of values. The wizard will display non-multiple choice questions with edit boxes (usually).

Translations are many to one for questions and answers. There must exist a translation for each question for each language the call script may be taken in (since the translation of the question is the actual text displayed in the wizard). Translations need not exist for answers, but should probably exist for answers to multiple choice questions. If a translation does not exist for an answer, and the question is multiple-choice, the value for the answer (S_CS_ANSWR.VALUE) will be displayed.

The translation for a question also contains a long column CS_TEXT, which is used for free-form text displayed-to the user when the Help button is pressed. This should be used to convey any additional information related to the question which the call taker may need to know.

Each question also contains the name of the business component Field the data it collects is meant to be stored in. If the question is a currency question, it also uses a separate field for the currency code. The names of these fields are stored in the SAVE_FIELD and CURCY_FIELD columns. For questions used in Scripts the SAVE_BUSOBJ and SAVE_BUSINESS COMPONENTS columns should also be used since fields in more than one business components can be saved to.

New questions and answers may be created, as well as new sources or databases for questions, and new destinations or databases for answers may be created by declaring new objects of a base object and by making use of objects, variables, and functions in the existing class, through inheritance.

Scripts

Graphically, a "script" may be represented by a graph whose nodes are pages, sets of questions, or even individual questions. Each traversal of the script is an execution of the call script. "Branches" are shown as children of a script and link questions used in that call script together.

This is shown in FIG. 8, which is a screen shot of the script designer application of the invention, and includes a logical overview of the script, with questions and links.

A script has a translation which includes the label for the call script and a long column which can be used to store information related to the call script (such as help). Scripts are stored in S_CS_PATH, branches in S_CS_EDGE and script translations in S_CS_PATH_LANG.

Since questions are linked together only in the context of a script (or page), individual questions may be used in any number of Scripts. The navigation between questions is specific to a call script. The script itself has a foreign key to the question which comes first in the script (S_CS_PATH.START_QUEST_ID). The branches are children of a script and define a transition from a question in the script to another question. There may be multiple branches "from" a single question, each of which represents a potential transition. The user keys for S_CS_EDGE are the parent script (PATH_ID), the from question (FROM_QUEST_ID) and optionally the answer in the from question (FROM_ANSWR_ID). If there is more than one branch from a question, the branches differ by the answer they represent. A branch from a question with no answer (NULL FROM_ANSWR_ID) represents a "default" transition from that question. This allows different Scripts to even take different transitions based on the same question.

There should be a branch from each answer to a question, e.g., a prior or subsequent question, or a branch without an answer (the default branch). There may be branches for some of the answers, but not all, and a default. In this case, if one of the answers for which there is a branch is chosen, that branch is used, otherwise the default branch is used. If there is no default branch and no branch for a particular answer, that answer is invalid for this call script.

Each question in the script which has no branches from it is a terminal question in the script (the end of the call script). When such a question is reached, the wizard changes the "Next>" button to "Finish" and ends the interaction when the user presses it and Scripts will jump to the Finish button.

A call script is designed to work with certain fields of a single business component. The name of the business components for which the call script was designed is stored in the SAVE_BUSINESS COMPONENTS column. Scripts are designed to work with zero or more business components and the business components column is left blank.

Internally, in a graphical representation, scripts are implemented with "paths" and branches are implemented with "edges."

Pages

Questions can be collected into pages. Each page is represented by a row in S_CS_PAGE. In this regard, a primary use of pages is to organize sets of questions for re-use within scripts. A page is used in a script by creating a branch to that page or by setting the scripts start page. A script that includes a page implicitly includes all questions defined within the page. In addition, a page of questions is displayed in a separate tab of the Script UI.

Edges have been enhanced to make the NEXT_QUEST_ID optional, which is valid if NEXT_PAGE_ID is specified. In this case, the script branches to the START_QUEST_ID of the page instead of a specific question, making pages usable as a black box.

Also, branches may be defined as belonging to the page by having a NULL PATH_ID. In this case, the branches specified by the page are merged into the branches specified by the script. If a branch specifies a script and a page, it overrides the page-specific branch.

Like scripts, questions and answers, pages have translations. The S_CS_PAGE_LANG table contains child records of S_CS_PAGE for each specified language. The first line of this text represents the page tab (short tag) and the test the help or informational text associated with the page.

Styles

Styles are a collection of visual attributes for scripts which can be re-used between different call script elements. Paths, pages and questions all have a style reference. Styles currently specify the font face, size and text color, with each element being optional. Settings made at a higher level (script, page) inherit downwards if not specified at a lower level (page, question). Each row in S_CS_STYLE represents a single style that can be picked for a script, page or question.

One style table has columns representing the individual attributes of the style. This is simpler and easier to manage than other representations and will lead to faster script loading. Also, there is only a single style table for all script elements. This allows the inheritance to work in the most natural way as new elements are added (question defaults can be specified at the script level) and styles to be reused at all levels.

Note that the elements of the styles are also settable on individual scripts, pages and questions regardless of the chosen style.

Answer Tables

Answer tables are needed to support scripts, especially those scripts which just collect data without requiring business components fields to store it. This is done by allowing answers to be stored in generic "answer tables." For a script which includes any questions which are marked as being stored in the answer table, a new record will be created in S_CS_RUN. Each question answered in that script for which answers are indicated to be stored will create a child record S_CS_RUN_ANSWR. There may be no additional functionality to process the answer tables, although they can be viewed from the client and exported through Enterprise Integration Manager (EIM).

Invoking Scripts

Scripts are invoked on a specific applet, against its business components. These have been and continue to be invoked using the applet InvokeMethod RunCallScript. Because Scripts are not applet-specific and in fact cause a new view to be gone to, they are invoked using the application InvokeMethod RunScript.

For consistency, the arguments to RunScript may be identical to RunCallScript, except, for example, for an additional viewName parameter. This parameter allows an alternate view to be gone to (other than the default "Call Script Player View"). This is useful if an alternate view is configured for a specific purpose. The view specified must contain an instance of the "Call Script Player Applet" somewhere on it to present the Script interface.

CancelScript and ResumeScript take no parameters.

Integration With Computer Telephony Integration (CTI) Systems

Scripts can be invoked by CTI. The client-side CTI machinery can be configured to invoke a Script rather than go to a particular database row. This is done by defining some new parameters in the appropriate EventResponse section of the CTI configuration file. If any parameters are found prefixed with Script, a Script will be invoked and the parameters passed to it. The parameters which are available are:

Script.ContactId
Script.CampaignId
Script.CampContactId
Script.ScriptName
Script.ScriptId
Script.LanguageCode
Script.CurrencyCode
Script.ViewName Either ScriptName or ScriptId must be specified to start a specific script. Otherwise, the user will be prompted for the script to run as usual.

CTI variables (from the switch) are available as well. These can be gotten through SVB using the GetCTIParameter function on the Script object. They can also be included in the Dashboard as variables using the CTI prefix (for example: "[CTI.ANI]" for Caller ID information).

The Script UI

The method and system of our invention includes a screen tab "SmartScripts" which will be used when scripts are started programmatically and which can be navigated to by the user.

When the Script tab is clicked on by the user, a dialog will come up which forces them to choose a Script (any script with NULL business components). When a script is started programmatically, the specified script will be set up automatically.

Call Script Authoring

Basic administration views allow creation of questions, scripts and pages through traditional list and form applets as well as through object oriented programming, as illustrated generally in FIG. 8.

Entering Questions and Answers

The view for entering and editing questions is "Call Center Administration|SmartScript|Questions View." This view is used to enter questions and their translations and their answers and translations.

Entering Scripts

The views "Call Center Administration|SmartScript|Scripts View.", and "Call Center Administration|SmartScript|Script Branches View." are used to enter the script. These views use a drill-down metaphor to display each page in the script and the possible transitions to next pages. Picklists are used to select the pages, questions and the answers.

The views "Call Center Administration|SmartScript|Pages View.", and "Call Center Administration|SmartScript|Page Branches View." are used to enter the pages.

Applications of the Scripting Method and System of Our Invention

In one application, a customer calls company X after receiving a direct mail piece about a new product offering, product Foo. In a CTI enabled system, the DNIS is identified and checked against the database for the appropriate campaign. ANI of the customer is also identified, and the user gets a screen pop of the script for product Foo with information about the customer filled into fields in the script. The user can address the customer, and can continue with the script. If the customer is not calling about product Foo, then the user can close the script and carry on with another activity, maybe collecting information in a response, or even launching another script, or transferring the call.

If the customer is calling about Foo, then the user (that is, the call center representative) can move through the script. As the customer answers questions for the user, the script navigates the user through the call. The workflow changes based on answers the customer has provided, so that the user is saying things that are meaningful to the customer.

If the customer changes his or her mind about something, the user can go back in the script, change the entry, and re-branch, if necessary, to a new location.

Information about the customer that resides in the database can be used to verify current products owned, address information, etc. and the user can update that information directly from the script.

If the customer decides to order the product, the user can enter order information directly into the script, or have the system launch the order entry view or even launch another system. Information gathered in the script can be passed to other databases, scripts, pages, or other elements in order to facilitate the workflow. Any information can also be sent back to the script for verification.

When the user is done with the script, he or she saves the session. The information is stored in the database. A marketing manger can go back and report on how many customers answered YES or NO to a specific question, or determine the correlations between answers to sets of questions and run a campaign based on that information.

For example, using the method and system of this invention, an end-user could write or modify a script using a derived object called MyScript. This is illustrated by the objects shown in Appendix A. For example, the user function MyScript.GetPage would return a page of the script by name. The script would then get a question by calling MyScript.GetQuestionText. The user function MyScript.GetPriorValue returns the prior value of the answer to the question for this .customer, before the user or representative made any customer entries. Alternatively, the function MyScript.GetInitialValue would return the beginning value of the answer to the question. Next in the user written routine, the function MyScript.GetSaveBusinessComponents is called to define where the answer is to be stored. Finally, the user derived function MyScript.SaveValue is called to store the customer's answer.

After writing or modifying a script the user can verify the internal logic and integrity of the script. This can include checking for unreachable pages, verifying pages used by the script, checking for unreachable questions, checking for missing answer branches, and checking for required translations, among other things. A further aspect of verification is to insure that all required components and objects are defined, and that there are no orphaned objects. A screen shot of an applet for accomplishing this is shown in FIG. 9.

Figure 9:
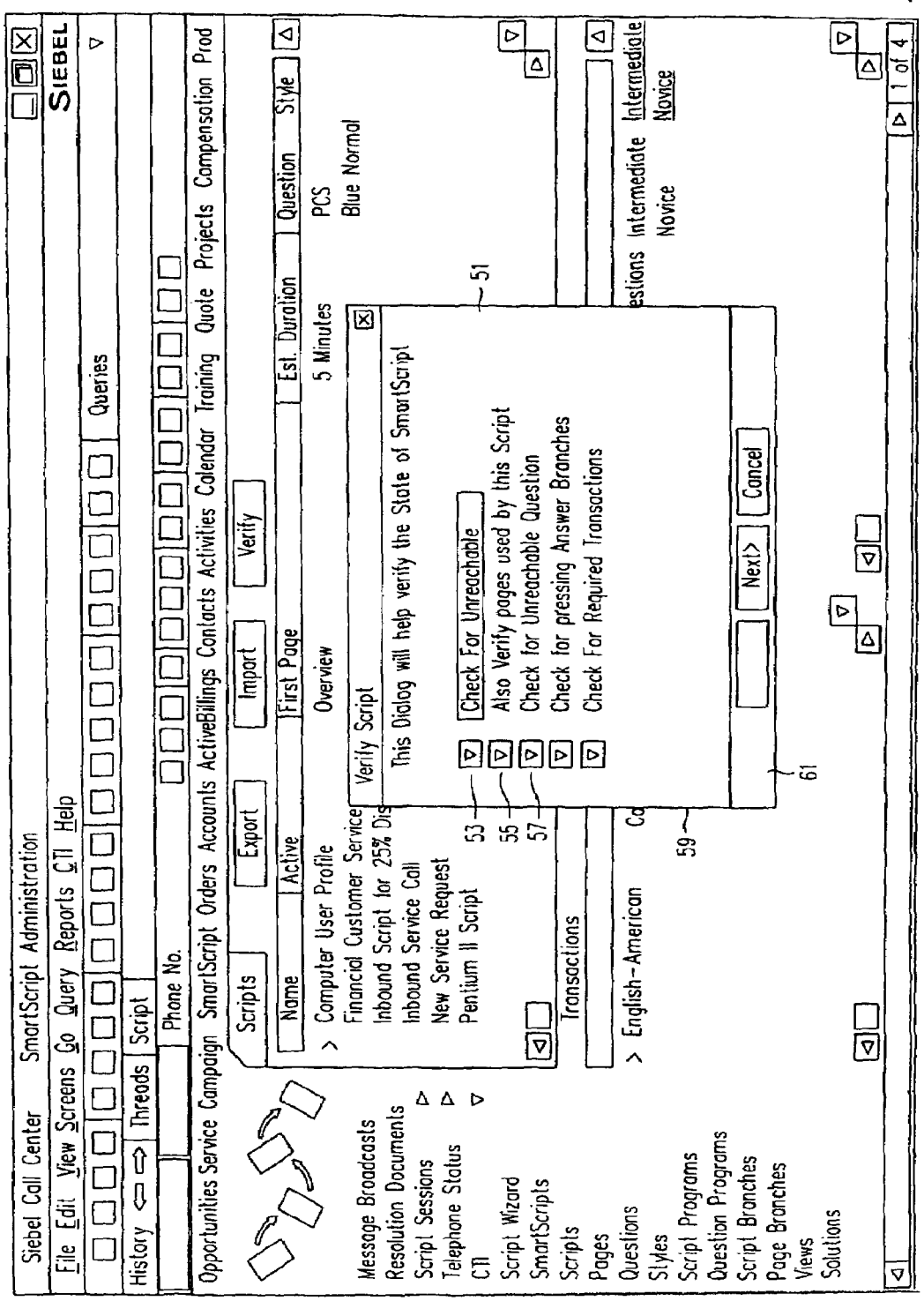
FIG. 9 shows a screen shoot of the verification screen of the invention.

FIG. 9 shows a verification dialog box 51, with check boxes to check for missing pages, 53, to verify pages used by the script, 55, to check for unreachable questions, 57, to check for missing answer branches, 59, and to check for required translations, 59. Verification is an iterative and/or a recursive process, which goes through questions, responses, branches, and links in a script to verify that there are no unreachable pages (that is, that there are no pages which lack calls to them or transfers into them), that there are no unreachable questions (that is, that there are no questions which lack calls to them or transfers into them, and, that there are no missing branches (that is, there are no branches which lack a source or a destination). These verifications may be made by working backwards from target questions and/or pages to source questions and/or pages, or by exhaustively working forward from source questions to target actions. Verification also includes verifying that all pages are used by the script, and that required translations and conversions are present.

To be noted is that MyScript uses only supplied objects, functions, and variables, inheriting the properties of the reusable code, and directly calling public functions. The internal operations of the objects need not be visible to the end user.

While the use of object oriented program has been illustrated by the use of an artifact called "MyScript" and the construction"MyScript.Object", it is, of course, to be understood that the point-and-click, drag-and-drop method of programming could just as easily be used. Furthermore, while the invention has been illustrated using object oriented programming, objects, and MS Visual Basic, it is to be understood that other programming languages and programming paradigms may be used.

Appendix A: Script Functions Written in MS Visual Basic

The Script object type will represent the entire state of a single Script being executed. Note that there is generally only a single script executing at any one time. An end-user seeking to personalize and enhance or otherwise customize the product, system, and method of this invention has the flexibility to add derived objects to these functions, and draw upon the internals of the functions through inheritance and code reusability.

Sub Cancel

This function causes the currently running script to be cancelled. This has the same effect as if the user had pressed the Cancel button in the applet.

Function CurrentPage ( ) as ScriptPage

This function returns the current page of the executing Script. Note that it is possible for there to be no current page, if the current question is not configured as part of any page, but as part of the Script itself.

Function CurrentQuestion ( ) as ScriptQuestion

This function returns the current question of the executing Script. This will always return a question object if the script is actively executing.

Function ExecutionState ( ) as Integer

This function returns a representation of the current state of the Script, represented as an integer value. The values are represented by the constants: ssInitializing (1), ssRunning (2), ssFinished (3), ssCancelled (4) or 0. If 0, the Script object has not been set up for execution (perhaps when enumerating available scripts).

Sub Finish

This function causes the currently running script to be finished. The collected answers are saved as appropriate. Note that this can fail if the user has not answered all the questions which require answers (mandatory questions).

Function GetCampaignId ( ) as String

Function GetCampContactId ( ) as String

Function GetContactId ( ) as String

These function returns the campaign ID, campaign/contact ID and contact Id as set up by the CTI machinery for outbound calls and for inbound calls if available. This information is stored in the session log for calls if available.

Function GetCTIParameter (Name as String) as String

This function returns a CTI switch parameter by name. This is useful for getting the switch-specific information if the Script was started through the CTI mechanism.

Function GetDashboardText ( ) as String

This function returns the current value of the Dashboard text (Descriptive Text), perhaps changed with SetDashboard- Text. Note that the actual value displayed may have substitutions made, but the pre-substitution text is returned by OriginalDashboardText.

Function GetLabelText ( ) as String

This function returns the language-specific label text for the script. This shows up in the page tab for questions which are part of the script itself (no page) and can be used in error messages or other user interactions.

Function GetPage (name as String) as ScriptPage

This function returns a page of the script by name. Note that this name is the non-translated name set during authoring, not the label displayed for a particular language.

Function GetQuestion (name as String) as ScriptQuestion

This function returns a question of the script by name. Note that this name is the non-translated name set during authoring, not the question text displayed for a particular language. This question must be one configured within the script itself (not in any page).

Function OriginalDashboardText ( ) as String

This function returns the configured value of the Dashboard text (Descriptive Text). Note that the actual value being displayed is returned by GetDashboardText.

Sub SetCampaignId (ID as String)
Sub SetCampContactId (ID as String)
Sub SetContactId (ID as String)

These procedures set the campaign ID, campaign/contact ID and contact ID if gathered through script execution. This information is stored in the session log.

Sub SetDashboardText (Text as String)

This procedure changes the Dashboard text (Descriptive Text) displayed at the top of the Script applet. Note that the actual value displayed may have substitutions made.

Function StartPage ( ) as ScriptPage

This function returns the configured start page on the Script itself. Note that this may be Nothing if the script does not have a configured start page (such as when the start question is within the script itself).

Function StartQuestion ( ) as ScriptQuestion

This function returns the configured start question on the Script itself. Note that this may be Nothing if the script does not have a configured start question.

Function SubstituteText (Text as String, Variable as String, Value as String) as String This function substitutes a single value in the Text, found as [Variable] with the Value and returns the changed text. Note that this can only be done once because the entire string "[Variable]" is replaced with the Value, but it can be called repeatedly to translate multiple values.

Sub Script_Open

This post-event is called after the Script is opened and execution is ready to begin. This is where the dashboard text can be updated, etc.

Sub Script_Cancel

This post-event is called when the script is cancelled to allow any last-minute cleanup or post-processing. If an error is raised during this procedure, it will be displayed to the user, but the script will remain cancelled.

Function Script_PreFinish as Integer

This pre-event is called when the user requests that the script be finished (usually by pressing the Finish button). This is a good place to check additional constraints on the script, which were not set up through configuration.

Sub Script_Finish

This post-event is called after the script has been finished to allow any last-minute cleanup or post-processing. If an error is raised during the procedure, it will be displayed to the user, but the script will remain finished.

Sub Script_Save

This post-event is called after the normal script state has been saved to business componentss and the answer table, but before the Script_Finish. This is a good place to save additional state collected by the Script not stored by the normal mechanisms.

ScriptPage VB Object

The ScriptPage object type will represent a single page of a Script being executed. This object is not directly scriptable, but is programmatically accessible using the methods of object oriented programming.

Function GetHelpText ( ) as String

This function returns the language-specific, context-sensitive, help text associated with the page. This may or may not be present, but if it is it is additional context information for the user.

Function GetLabelText ( ) as String

This function returns the language-specific label text for the page. This shows up in the page tab and can be used in error messages or other user interactions.

Function GetQuestion (name as String) as ScriptQuestion

This function returns a question of the page by name. Note that this name is the non-translated name set during authoring, not the question text displayed for a particular language.

Function Script ( ) as Script

This function returns the containing script of the page.

Function StartQuestion ( ) as ScriptQuestion

This function returns the configured start question on the page. Note that pages must have a start question so this cannot be Nothing.

ScriptQuestion VB Object

The ScriptQuestion object type will represent a single question of a Script being executed. This object is the smallest granularity and most often scripted, using the methods, tools, and techniques of object oriented programming.

Function AnswerType ( ) as Integer

This function returns the type of answer the current question collects. The return value will be one of: ssString (1), ssInteger (2), ssNumber (3), ssCurrency (4), ssBoolean (5), ssDate (6) or ssInformation (7).

Function CurrencyFieldName ( ) as String

This function returns the configured field name in which the currency code is stored. Note that this is only used for questions which accept currency values (AnswerType=ssCurrency).

Function GetCurrentCurrencyCode ( ) as String

This function returns the current currency code entered by the user for this question (if a currency question). This may have changed many times as the user worked through the script.

Function GetCurrentExchangeDate ( ) as String

This function returns the current currency exchange date entered by the user for this question (if a currency question). This may have changed many times as the user worked through the script.

Function GetCurrentValue ( ) as String

This function returns the current value entered by the user for this question. This may have changed many times as the user worked through the script.

Function GetHelpText ( ) as String

This function returns the language-specific help text associated with the question. This may or may not be present, but if it is it is additional context information for the user.

Function GetInitialCurrencyCode ( ) as String

This function returns the initial currency code for this question before the user started executing the script (if a currency question). This is usually Empty unless the value came from a business components field or was set up by VB in Script_Open.

Function GetInitialExchangeDate ( ) as String

This function returns the initial currency exchange date for this question before the user started executing the script (if a currency question). This is usually Empty unless the value came from a business components field or was set up by VB in Script_Open.

Function GetInitialValue ( ) as String

This function returns the initial value for this question before the user started executing the script. This is usually Empty unless the value came from a business components field or was set up by VB in Script_Open.

Function GetPriorCurrencyCode ( ) as String

This function returns the currency code for this question before the user got to it the most recent time (if a currency question). This may be GetInitialValue if the user has never entered the question or the GetCurrentValue after the user left it the most recent time. This is usually only used for the current question.

Function GetPriorExchangeDate ( ) as String

This function returns the currency exchange date for this question before the user got to it the most recent time (if a currency question). This may be GetInitialValue if the user has never entered the question or the GetCurrentValue after the user left it the most recent time. This is usually only used for the current question.

Function GetPriorValue ( ) as String

This function returns the value for this question before the user got to it the most recent time. This may be GetInitialValue if the user has never entered the question or the GetCurrentValue after the user left it the most recent time. This is usually only used for the current question.

Function GetQuestionText ( ) as String

This function returns the displayed question text unless previously changed with SetQuestionText. The original configured text can be gotten with OriginalQuestionText.

Function GetSavebusiness components ( ) as business components

This function returns the instance of the business component used to store the answer in. If no field and business components are configured on this question, it returns Nothing.

Function GetSaveBusObj ( ) as BusObj

This function returns the instance of the business object used to store the answer in. If no business components or BusObj are configured on this question, it returns Nothing.

Function HasDefaultAnswer ( ) as Boolean

This function returns true if the question is configured with a default answer (Default Answer chosen).

Function MustAnswer ( ) as Integer

This function returns true if the question is configured to require an answer (Must Answer checked). It can be use as a true/false value or broken down into the actual tri-state values: ssOptional (0), ssMandatory (1) and ssIfReached (2).

Function OriginalQuestionText ( ) as String

This function returns the configured value of the question text. The actual value displayed is gotten through GetQuestionText.

Function Page ( ) as ScriptPage

This function returns the containing page of the question.

Function Script ( ) as Script

This function returns the containing script of the question.

Function Savebusiness componentsName ( ) as String

This function returns the configured business component in which the answer is stored. This should have been specified if a field was specified.

Function SaveBusObjName ( ) as String

This function returns the configured business object in which the answer is stored. This should have been specified if a field and business components were specified.

Function SaveFieldName ( ) as String

This function returns the configured field name in which the answer value is stored. This may not be present for all questions.

Sub SetCurrentValue (Value as String, [CurrencyCode as String, ExchangeDate as String])

This procedure sets the value for the question as though the user had entered it. All validation and branching is activated. If the question is a currency question (answer type is "Currency"), the currency code and exchange date should also be specified.

Sub SetQuestionText (Text as String)

This procedure changes the displayed question text. Note that no substitutions are supported in the question text automatically.

Function SubstituteText (Text as String, Variable as String, Value as String) as String This function substitutes a single value in the Text, found as [Variable] with the Value. Note that this can only be done once because the entire string "[Variable]" is replaced with the Value.

Function WasAnswered as Boolean

This function returns true if the user answered this question and false otherwise. Note that just passing through a question does not count as answering, the user must type or pick a value.

Sub Question_Enter

This post-event is called after the question has been entered and all pre-question processing is complete. This is a good place to change the question text or set the current value.

Function Question_PreLeave as Integer

This pre-event is called on the question before the user leave it by jumping or proceeding (but not by Undo or Backup). This allows question-specific validation to be performed.

Function Question_PreBranch (Answer as String ByRef) as Integer

This pre-event allows the choice of answer to be substituted by the VB script. If this event is not overridden, the normal branching logic of matching answers to branches is performed. The final value of the Answer argument is compared against the answers given to determine which branch is taken out of this question. This allows arbitrary processing to determine branching (among pre-configured branches) regardless of the actual stored answer. The value returned in the parameter will not be stored as the answer to the question, but will be used to choose the answer used for branching.

Sub Question_Leave

This post-event is called on the question after branching has been determined and all built-in validations have been performed.

Appendix B: Database Tables

This appendix lists the tables related to call scripting. In these listings, the system columns always come first (and are the same for every table), followed by the user primary key columns, and lastly the attribute columns. Each group is separated by a horizontal rule. For child tables, the first of the user key columns is a foreign key into the parent table. A brief description of each column is given here

| Column system columns | Required | Type | Description standard system columns |
|---|---|---|---|
| | | | S_CS_QUEST |
| NAME | Yes | varchar(100) | Identifier of question (administration of) |
| ANSWR_TYPE_CD | Yes | varchar(30) | Type of answer collected for question |
| CHOICE_FLG | Yes | char(1) | Is this a multiple-choice question? |
| MIN_VAL | No | number | Minimum for numeric and date question |
| MAX_VAL | No | number | Maximum for numeric and date question |
| CURCY_CD | No | varchar(20) | Currency code value for min/max |
| SAVE_FIELD | No | varchar(100) | BusComp field to save value to |
| CURCY_FIELD | No | varchar(100) | BusComp field to save currency code table |
| SAVE_BUSOBJ | No | varchar(75) | BusObj for save context |
| SAVE_BUSCOMP | No | varchar(75) | BusComp to save value in |
| ANS_TBL_FLG | No | char(1) | Do we save response in answer table? |
| MUST_ANSWER_CD | No | varchar(30) | Answer is required before proceeding |
| STYLE_ID | No | varchar(15) | Style used for question |
| FONT_FACE | No | varchar(255) | Font face for question text (override) |
| FONT_SIZE | No | number | Font size (override) |
| TEXT_COLOR | No | varchar(30) | Text color (override) |
| DFLT_ANSWR_ID | No | varchar(15) | Answer picked by default |
| DET_APPLET_NAME | No | varchar (75) | Detail applet (special value interface) |
| PICK_APPLET_NAME | No | varchar (75) | Picklist applet (multi-column picklists) |
| MVG_APPLET_NAME | No | varchar (75) | MVG applet |

If ANS_TBL_FLG is true, user responses are saved to S_CS_RUN_ANSWR when script is saved.
STYLE_ID specifies the style for this question. Elements not specified are inherited from the page, then the script (script).
FONT_FACE, FONT_SIZE, TEXT_COLOR are elements of the style which may be overridden on this particular question.

| Column | Required | Type | Description |
|---|---|---|---|
| | | | S_CS_QUEST_SCPT |
| QUEST_ID | Yes | varchar(15) | ID of parent call script question |
| NAME | Yes | varchar(75) | Name of procedure |
| SCRIPT | No | long | Body of procedure (VB) |
| SEQUENCE | No | number(10) | Order in which procedures are compiled |
| | | | S_CS_QUEST_LANG |
| QUEST_ID | Yes | varchar(15) | ID of parent question |
| LANG_ID | Yes | varchar(15) | Language for this translation |
| QUESTION | Yes | varchar(255) | Translation of the question text |
| CS_TEXT | No | varchar(2000) | Translation of the help text |
| | | | S_CS_ANSWR |
| QUEST_ID | Yes | varchar(15) | ID of parent question |
| ORDER_BY | Yes | integer | Order of answer in question (1-based) |
| VALUE | Yes | varchar(255) | Save value for answer (literal) |
| CURCY_CD | No | varchar(20) | Currency code for save value |
| | | | S_CS_ANSWR_LANG |
| ANSWR_ID | Yes | varchar(15) | ID of parent answer |
| LANG_ID | Yes | varchar(15) | Language for this translation |
| ANSWER | Yes | varchar(255) | Translated label for answer |
| | | | S_CS_PATH |
| NAME | Yes | varchar(100) | Identifier of call script (administration only) |
| START_QUEST_ID | No | varchar(15) | ID of first question in path |
| SAVE_BUSCOMP | No | varchar(100) | [BusComp] name script is designed for |
| EST_CS_DURATION | No | Number | Expected call script duration |
| DURATION_UOM_CD | No | varchar(30) | Units for EST_CS_DURATION |
| START_PAGE_ID | No | varchar(15) | ID of first page in path |
| STYLE_ID | No | varchar(15) | Style to be used as default for script |
| FONT_FACE | No | varchar(255) | Font face for question text (override) |
| FONT_SIZE | No | number | Font size (override) |
| TEXT_COLOR | No | varchar(30) | Text color (override) |
| REVEAL_CD | No | varchar(30) | How questions are revealed (override) |
| LAYOUT_CD | No | varchar(30) | How questions are laid out (override) |
| JUMP_OK_FLG | No | char(1) | Can the user jump around in the script |
| SAVE_RUN_CD | No | varchar(30) | When to write a record to the answer table |

-continued

| Column system columns | Required | Type | Description standard system columns |
|---|---|---|---|
| HELP_STYLE_ID | No | varchar(15) | Style for dashboard text (help text) |
| ACTIVE_FLG | No | char(1) | Allow this script to be run |

STYLE_ID specifies the style applied by default for all questions used in the script. Elements of the chosen style may be overridden at the page and question levels.
FONT_FACE, FONT_SIZE, TEXT_COLOR, REVEAL_CD, LAYOUT_CD are elements of the style which may be overridden for the path.
SAVE_RUN_CD specifies when a record should be saved to the answer table for the script run. (Child records are saved for questions with SAVE_ANS_TBL set to Y.)

S_CS_PATH_SCPT (New)

| Column | Required | Type | Description |
|---|---|---|---|
| PATH_ID | Yes | varchar(15) | ID of parent call script |
| NAME | Yes | varchar(75) | Name of procedure |
| SCRIPT | No | long | Body of procedure (VB) |
| SEQUENCE | No | number(10) | Order in which procedures are compiled |

S_CS_PATH_LANG

| Column | Required | Type | Description |
|---|---|---|---|
| PATH_ID | Yes | varchar(15) | ID of parent call script |
| LANG_ID | Yes | varchar(15) | Language for this translation |
| LABEL | Yes | varchar(255) | Translation of call script "label" |
| CS_TEXT | No | varchar(2000) | Help text for call script |

S_CS_EDGE

| Column | Required | Type | Description |
|---|---|---|---|
| PATH_ID | No | varchar(15) | ID of parent call script |
| PAGE_ID | No | varchar(15) | ID of parent page |
| FROM_QUEST_ID | Yes | varchar(15) | ID of question from which this edge starts |
| FROM_ANSWR_ID | No | varchar(15) | ID of answer from which this edge starts |
| NEXT_QUEST_ID | No | varchar(15) | ID of question to which this edge leads |
| NEXT_PAGE_ID | No | varchar(15) | ID of page to which edge leads |

Changes:
PATH_ID is optional. PAGE_ID alone is used for a page-specific edge.
PAGE_ID is used for the containing page of the edge.
NEXT_QUEST_ID becomes optional. NEXT_PAGE_ID alone can define branching

S_CS_PATH_SRC

| Column | Required | Type | Description |
|---|---|---|---|
| SRC_ID | Yes | varchar(15) | ID of parent campaign |
| PATH_ID | Yes | varchar(15) | ID of parent call script |

S_CS_PAGE (New)

| Column | Required | Type | Description |
|---|---|---|---|
| NAME | Yes | varchar(100) | Identifying text of page (not translated) |
| START_QUEST_ID | Yes | varchar(15) | ID of first question in page |
| STYLE_ID | No | varchar(15) | Style used as default for this page |
| FONT_FACE | No | varchar(255) | Font face for question text (override) |
| FONT_SIZE | No | number | Font size (override) |
| TEXT_COLOR | No | varchar(30) | Text color (override) |
| REVEAL_CD | No | varchar(30) | How questions are revealed (override) |
| LAYOUT_CD | No | varchar(30) | How questions are laid out (override) |

S_CS_PAGE_LANG (New)

| Column | Required | Type | Description |
|---|---|---|---|
| PAGE_ID | Yes | varchar(15) | ID of parent page |
| LANG_ID | Yes | varchar(15) | Language for this translation |
| LABEL | Yes | varchar(255) | Page title (displyed in tab) |
| CS_TEXT | No | varchar(2000) | Help text for page |

S_CS_RUN (New)

| Column | Required | Type | Description |
|---|---|---|---|
| PATH_ID | Yes | varchar(15) | ID of script used |
| START_DT | Yes | datetime | Time at which script was started |
| POSTN_ID | No | varchar(15) | Position of employee running script |
| DURATION | No | number | Time taken to complete script |
| DURATION_UOM_CD | No | varchar(30) | Duration of script unit of measure |
| SRC_ID | No | varchar(15) | Campaign ID (outbound calls) |
| CON_ID | No | varchar(15) | Callee ID (if known) |
| CAMP_CON_ID | No | varchar(15) | Campaign/contact instance |
| STATUS_CD | No | varchar(30) | Completion status of script |

-continued

| Column system columns | Required | Type | Description standard system columns |
|---|---|---|---|
| S_CS_RUN_ANSWR (New) | | | |
| RUN_ID | Yes | varchar(15) | ID of parent script run |
| PAGE_ID | No | varchar(15) | ID of page answered question was in |
| QUEST_ID | Yes | varchar(15) | ID of question answered |
| ANSWER_TEXT | No | varchar(2000) | Answer given to question |
| CURCY_CD | No | varchar(15) | Currency code |
| EXCH_DT | No | date | Exchange data for currency value |
| ANSWR_ID | No | varchar(15) | ID of answer chosen (if any) |
| DURATION | No | number | Time spent on question |
| DURATION_UOM_CD | No | varchar(30) | Time spent on question unit of measure |
| S_CS_STYLE (New) | | | |
| NAME | Yes | varchar(100) | Identifying text of style (not translated) |
| FONT_FACE | No | varchar(255) | Font face for question text |
| FONT_SIZE | No | number | Font size |
| TEXT_COLOR | No | varchar(30) | Text color |
| REVEAL_CD | No | varchar(30) | How questions are revealed |
| LAYOUT_CD | No | varchar(30) | How questions are laid out |
| BOLD_FLG | No | char(1) | Text bold |
| ITALIC_FLG | No | char(1) | Text italic |
| S_CS_STYLE_LANG (New) | | | |
| STYLE_ID | Yes | varchar(15) | ID of parent style |
| LANG_ID | Yes | varchar(15) | Language for this translation |
| FONT_FACE | No | varchar(255) | Font face (override on style) |
| FONT_SIZE | No | number | Font size (override) |
| BOLD_FLG | No | char(1) | Text bold (override) |
| ITALIC_FLG | No | char(1) | Text italic (override) |

Appendix C: Sample Visual Basic Procedure

This appendix shows the Visual Basic (VB) procedure that implements dynamic insertion of an answer into a question text. Specifically, it inserts the caller's title and last name into the target question.

```
Sub Question_Enter
    Dim MM as String
    Dim LastName as String
    Dim Q as SmartScriptQustion
    Dim Text as String
    Set Q=Page.GetQuestion ("Contact: Mr/Ms")
    MM=Q.GetCurrentValue
    Set Q=Page.GetQuestion ("Contact: LastName")
    LastName=Q.GetCurrentValue
    Text=OriginalQuestionText
    Text=SubstituteText (Text, "Contact.M/M", MM)
    Text=SubstituteText (Text, "Contact.LastName", LastName)
    SetQuestionText (Text)
End Sub
```

While the invention has been described with respect to certain preferred embodiments and exemplifications, it is not intended to limit the scope of the claims thereby, but solely by the claims appended hereto.

We claim:

1. A computer system, comprising:
   one or more computers;
   a set of reusable components, wherein said reusable components comprise at least one of objects, data, public functions, and private functions, and wherein said public functions can be accessed through derived classes of objects;
   a script; and
   an associated database, wherein
   said computer system is configured to facilitate an established interaction between a user and a customer,
   said computer system is configured to use said reusable components,
   said script comprises a hierarchical set of structured pages,
   at least one of said structured pages comprising a structured set of questions is presented to said user by the computer system and is presented to said customer by said user,
   at least one of said questions having an associated list of likely customer responses, and
   at least one of said customer responses being associated with a link to the associated database, and
   said link to the associated database is a query resulting in an output of the associated database, wherein said output of the associated database is a link to another question in the script.

2. The system of claim 1 wherein said reusable components comprise routines, subroutines, and functions, pass data through global variables to local variables therein, and are accessed through calls.

3. The computer system of claim 2, wherein the output of the database is a link to another question in the script.

4. The computer system of claim 1, wherein
   at least one of said customer responses is associated with a link to another question in the script, and
   the associated link to another question in the script is a link to another question in another page in the script.

5. The computer system of claim 1, wherein said system further comprises a computer-readable storage medium storing a computer program code for facilitating the established interaction between the user and the customer, said computer program code comprising the script and the associated database, wherein said computer program code causes the system to:
- a) present a question to the user;
- b) receive a response from the user; and
- c) branch by linking to either
  - i) the associated database or
  - ii) to another question.

6. The computer system of claim 5 wherein the computer program code causes the query of the associated database.

7. The computer system of claim 6 wherein the computer program code causes the associated database to output the link to another question in the script.

8. The computer system of claim 6 wherein the computer program code causes the associated database to output data related to the established interaction.

9. The computer system of claim 5 wherein the computer program code causes a link to another question which is in another page in the script.

10. The computer system of claim 5 wherein said computer program code comprises base objects containing data, public functions, and private functions, and said computer program code is configured to utilize additional classes of objects inheriting properties of said base objects.

11. The computer system of claim 5 wherein said computer program code comprises functions, routines, and subroutines, containing data, global variables, and local variables, and said computer program code is configured to utilize additional calls calling said functions, routines, and subroutines.

12. The computer system of claim 1 wherein said computer system is configured to verify one or more of the absence of unreachable pages, unreachable questions, and missing answer branches, and the presence of pages called by the script and translations.

13. The computer system of claim 1 further comprising:
- a script designer user interface configured to display a logical overview of the script hierarchy, wherein
  - said logical overview comprises said structured set of questions and links between said questions and said likely customer responses.

14. A method in a computing system, comprising:
configuring software, wherein
- said configuring utilizes a set of reusable components called by said software,
- said software is configured to facilitate an established interaction between a user and a customer,
- said software comprises a script and an associated database,
- said script comprises a hierarchical set of structured pages,
- at least one of said structured pages comprising a structured set of questions presented to said user by the computing system and presented to said customer by said user,
- at least one of said questions having an associated list of likely customer responses, and
- at least one of said likely customer responses being associated with a link to the associated database;
presenting a question to a user which the user presents to the customer;
querying the associated database through the link to the associated database, wherein
- said querying results in an output of the database, and
- the output of the database is a link to another question in the script;
the user receiving a response from the customer; and
the software branching in response to the response from the customer by linking to the associated database or to another question.

15. The method of claim 14 wherein the output of the database is data related to the interaction.

16. The method of claim 14, further comprising linking to another page in the script.

17. The method of claim 14, further comprising creating derived objects and calling a set of reusable base objects, data, public functions, and private functions.

18. The method of claim 14, further comprising verifying one or more of the absence of unreachable pages, unreachable questions, and missing answer branches, and the presence of pages called by the script and translations.

* * * * *

UNITED STATES PATENT AND TRADEMARK OFFICE
CERTIFICATE OF CORRECTION

| | | |
|---|---|---|
| PATENT NO. | : 7,467,135 B2 | |
| APPLICATION NO. | : 10/900339 | |
| DATED | : December 16, 2008 | |
| INVENTOR(S) | : Coker et al. | |

It is certified that error appears in the above-identified patent and that said Letters Patent is hereby corrected as shown below:

In column 1, line 4, after "filed" insert -- on --.

In column 2, line 14, delete "tn" and insert -- to --, therefor.

In column 2, line 66, delete "languagesd" and insert -- languages --, therefor.

In column 3, line 12, delete "hierarchicaly" and insert -- hierarchically --, therefor.

In column 5, line 31, delete "inherting" and insert -- inheriting --, therefor.

In column 8, line 32, after "computed" insert -- . --.

In column 8, line 52, delete "21b1, 21b2" and insert -- 21b1 and 21b2 --, therefor.

In column 9, line 26, delete "$21^1$" and insert -- $21^i$ --, therefor.

In column 9, line 37, delete "$13^{iiii}$" and insert -- $13^{iv}$ --, therefor.

In column 9, line 37, delete ""NO" and insert -- "NO" --, therefor.

In column 9, line 40, delete "Convince" and insert -- "Convince --, therefor.

In column 9, line 50, delete "key?"" and insert -- key?", --, therefor.

In column 10, line 31, delete "18" and insert -- 18c --, therefor.

In column 11, line 47, delete "displayed-to" and insert -- displayed to --, therefor.

In column 18, line 3, delete "componentss" and insert -- components --, therefor.

In column 23, line 56, delete "displyed" and insert -- displayed --, therefor.

In column 26, line 52, in claim 2, after "The" insert -- computer --.

In column 26, line 52, in claim 2, delete "1" and insert -- 1, --, therefor.

In column 26, lines 56-57, in claim 3, delete "The computer system of claim 2, wherein the output of the database is a link to another question in the script." and insert -- The computer system of claim 1, wherein the output of the database is data related to the interaction. --, therefor.

Signed and Sealed this

Twentieth Day of April, 2010

David J. Kappos
*Director of the United States Patent and Trademark Office*